United States Patent [19]

Smith

[11] Patent Number: 4,688,815
[45] Date of Patent: Aug. 25, 1987

[54] HYDRAULICALLY DRIVEN BICYCLE

[75] Inventor: William V. Smith, Memphis, Tenn.

[73] Assignee: Lectrolarm Custom Systems, Inc., Memphis, Tenn.

[21] Appl. No.: 593,835

[22] Filed: Mar. 27, 1984

[51] Int. Cl.$^4$ .............................................. B62M 19/00
[52] U.S. Cl. ...................................... 280/216; 418/26; 418/27; 418/30; 418/31; 418/158; 418/159; 418/266; 418/268
[58] Field of Search .............. 280/216, 259, 210, 212, 280/214; 180/76, 308; 272/73, 130; 418/266, 259, 268, 30, 29, 158, 159, 26, 27, 31

[56] References Cited

U.S. PATENT DOCUMENTS

| | | | |
|---|---|---|---|
| 3,008,423 | 11/1961 | Miller | 418/158 X |
| 3,266,429 | 8/1966 | Stockett, Jr. | 418/30 X |
| 3,663,130 | 5/1972 | Lincks | 418/31 |
| 3,744,939 | 7/1973 | Grennan et al. | 418/30 |
| 4,290,621 | 9/1981 | Davey | 280/216 |
| 4,331,223 | 5/1982 | Charlat et al. | 418/158 X |
| 4,546,990 | 10/1985 | Harriger | 280/216 |

FOREIGN PATENT DOCUMENTS 2291 of 1910 United Kingdom .................. 418/27

*Primary Examiner*—Joseph F. Peters, Jr.
*Assistant Examiner*—Mitchell J. Hill
*Attorney, Agent, or Firm*—Dickstein, Shapiro & Morin

[57] ABSTRACT

A hydraulically driven bicycle frame with two axle members coupled to the bicycle frame and front and rear wheels mounted on such axles for rotation about the axis of the respective axle and a pair of pedals mounted on a pedal drive shaft coupled to the bicycle frame for rotation for applying manual power for operating the hydraulic system of the bicycle. The hydraulically driven bicycle has a hydraulic pump mechanism and a hydraulic drive mechanism. The hydraulic pump mechanism is operated by rotational movement of the pedal drive shaft. The hydraulic pump mechanism includes a pump housing having two sectional pump housing members that form a pump chamber between them. The two sectional pump housing members are capable of relative movement with respect to each other so that the pump chamber is capable of being varied in size for varying the flow of fluid through the pump mechanism. The hydraulic drive mechanism is driven by the fluid pump by the pump system and is coupled to one of the wheels of the bicycle for providing a rotational force to such wheel. The hydraulic drive mechanism includes a drive housing having two sectional drive housing members which form a drive chamber between them. The two sectional drive members are capable of relative movement with respect to each other so that the drive chamber is capable of being varied in size for varying the flow of fluid through the hydraulic drive mechanism. The hydraulic pump mechanism and the hydraulic drive mechanism are interconnected by fluid circulating tubes so that a closed hydraulic system is constructed on the bicycle.

46 Claims, 6 Drawing Figures

HYDRAULICALLY DRIVEN BICYCLE

BACKGROUND OF THE INVENTION

The present invention relates to a hydraulically driven bicycle.

A wide variety of different types of two, three and four wheel manually powered hydraulically driven vehicles have been developed over the years. Each of these vehicles has depended upon power generated by the operator of the vehicle by rotating a set of pedals for causing a fluid to circulate through a closed hydraulic system. The circulating fluid is utilized for creating a drive force for powering one of the wheels of the vehicle. Examples of such hydraulically driven vehicles are shown in those patents discussed below.

U.S. Pat. No. 4,290,621 to Davey discloses a hydraulic system for a bicycle, which hydraulic system includes a multi-speed drive mechanism. The speed at which the bicycle is driven by the hydraulic mechanism disclosed in this patent can be varied by varying the volume of the fluid pumped to the hydraulic motor. The hydraulic motor is connected to the rear wheel of the bicycle for driving the rear wheel. The hydraulic system includes a multi-chambered gear pump which is powered by rotation of the pedals. Each of the chambers is provided with a valve recirculation line so that as the pump is operated, the fluid from each chamber can be either recirculated through the pump or directed to a hydraulic line leading to a multi-chambered hydraulic motor which is connected in driving engagement with the rear wheel of the bicycle.

U.S. Pat. No. 1,313,081 to Finney discloses a fluid drive mechanism for driving a two passenger vehicle. In the system disclosed by this patent, the fluid utilized can be either a hydraulic fluid or compressed air. Drive wheels are attached to the front and rear wheels of the vehicle. Each of the drive wheels is arranged within a casing. Each of the casings has an inlet opening and an outlet opening so that fluid can be pumped through the casing. As fluid moves through the casing, it engages a series of blades on the drive wheel which causes rotation of the drive wheel.

U.S. Pat. No. 3,811,704 to Gregoric discloses a hydraulically driven bicycle. The foot pedal of the bicycle disclosed by this patent is used for pumping a hydraulic fluid under pressure to a drive wheel for creating a torque force for providing drive power for the bicycle. The conduit for the drive system for the hydraulic fluid is formed in the frame of the bicycle. The hydraulic system operates to drive the rear wheel of the bicycle.

U.S. Pat. No. 3,850,448 discloses a hydraulic drive system for driving a bicycle and also discloses the use of a hydraulic system for providing a braking action for the bicycle. The force for driving and braking of the bicycle is determined by the direction in which the fluid is pumped within the hydraulic system disclosed in the patent. The fluid can be pumped in one direction for providing a forward drive force for the bicycle and the direction of flow of fluid can be reversed for providing a braking force to the bicycle. The fluid is pumped by a hydraulic pump mounted on the frame of the bicycle. The fluid is pumped to a rear wheel impeller housing and to a front wheel impeller housing. The fluid is pumped through pipes in the frame of the bicycle for driving the front and rear wheel impellers of the bicycle for providing the driving and braking forces to the bicycle.

U.S. Pat. No. 4,078,816 to Smith discloses a hydraulically driven two-wheeled pedicab. The hydraulic system disclosed by this patent includes a Wankel engine. The hydraulic fluid is pumped through the hydraulic system for driving this Wankel engine which in turn generates the drive force for propelling the pedicab.

U.S. Pat. No. 4,087,105 to Amarantos discloses a bicycle which is hydraulically driven with fluid circulated through the hydraulic system by rotation of the bicycle pedals. A throttle valve is placed within the hydraulic fluid flow line of the hydraulic system disclosed in this patent for controlling the flow of fluid discharged from the hydraulically driven motor. By closing this throttle valve, the motor is caused to act as a brake and slows down the movement of the bicycle.

Additional hydraulic drive systems for operator powered vehicles are disclosed in the following U.S. Pat. Nos. 2,793,876 to Allwes; No. 3,729,213 to Hudspeth et al.; No. 3,941,075 to Rupenian; No. 4,082,264 to Santos; No. 4,249,750 to Kantner; and, No. 4,347,700 to Kantner et al.

SUMMARY OF THE INVENTION

An object of the present invention is to provide an improved manually powered hydraulically driven bicycle.

Another object of the present invention is to provide a hydraulically driven bicycle in which the effective ratio between the pump and drive mechanism can be varied by the operator of the bicycle.

A further object of the present invention is to provide a hydraulically driven bicycle having a hydraulic pump mechanism and a hydraulic drive mechanism in which the chambers of both mechanisms can be varied in size for varying the flow of fluid through such mechanisms.

Still another object of the present invention is to provide a hydraulically driven bicycle having a hydraulic pump mechanism and a hydraulic drive mechanism in which the chambers of both mechanisms can be varied in size for varying the flow of fluid through such mechanisms and each mechanism includes a rotatable cylinder having a plurality of extendable vanes that extend from such cylinder by a distance dependent upon the size of the chamber.

A still further object of the present invention is to provide an improved hydraulically driven bicycle in which the hydraulic drive mechanism can be located on either the front or rear wheel of the bicycle or two such mechanisms can be used for driving both the front and rear wheels of the bicycle.

Still another object of the present invention is to provide an improved hydraulically driven bicycle in which the drive mechanism can be utilized as a brake for braking the rotating bicycle wheel on which such drive mechanism is mounted.

These objectives are achieved by the manually powered hydraulically driven bicycle of the present invention. As with all bicycles, the bicycle of the present invention has a bicycle frame with two axle members coupled to the bicycle frame and front and rear wheels mounted on such axles for rotation about the axis of the respective axle and a pair of pedals mounted on a pedal drive shaft coupled to the bicycle frame for rotation for applying manual power for operating the bicycle. The hydraulically driven bicycle of the present invention also has a hydraulic pump mechanism and a hydraulic drive mechanism such as set forth below. The hydraulic pump mechanism is operated by rotational movement of the pedal drive shaft. The hydraulic pump mechanism includes a pump housing having two sectional pump housing members that form a pump chamber between them. The two sectional pump housing members are capable of relative movement with respect to each other so that the pump chamber is capable of being varied in size for varying the flow of fluid through the pump mechanism. A rotatable pumping member pumps fluid through the pump chamber. The pedal drive shaft is coupled to this rotatable pumping member for driving such pumping member. The hydraulic drive mechanism is coupled to one of the wheels of the bicycle for providing a rotational force to such wheel. The hydraulic drive mechanism includes a drive housing having two sectional drive housing members which form a drive chamber between them. The two sectional drive members are capable of relative movement with respect to each other so that the drive chamber is capable of being varied in size for varying the flow of fluid through the hydraulic drive mechanism. A rotatable driving member is arranged to be rotated as fluid is circulated through the drive chamber. An output drive shaft is coupled to and rotated by the hydraulic driving member as fluid is circulated through the drive chamber. This output drive shaft is coupled to the wheel of the bicycle that is to be driven by the hydraulic system. The hydraulic pump mechanism and the hydraulic drive mechanism are interconnected by fluid circulating tubes so that a closed hydraulic system is constructed on the bicycle.

The rotatable pumping member includes a pump cylinder having a plurality of radially extending slots and a corresponding plurality of vanes arranged and movable within such slots in the pump cylinder. Each of the vanes is capable of having its outer end extend past the outer circumferential surface of the pump cylinder. As the cylinder is rotated, the vanes can be caused to extend out of the cylinder into the pump chamber so that the rotational movement of the cylinder pumps fluid through the pump chamber. The distance that each of the pump vanes extends past the circumferential surface of the pump cylinder during rotation varies in dependence upon the size of the pump chamber.

The two sectional pump housing members of the pump mechanism surround the pump cylinder. A first of these two sectional housing members is arranged juxtaposed to the pump cylinder. The second of the sectional pump housing members is movable with respect to the first sectional member and the pump cylinder for varying the distance between the second sectional member and the pump cylinder. This space between the second sectional member and the pump cylinder defines the pump chamber.

The pump vanes extend out of their respective slots as the pump cylinder is rotated so that the pump vanes are in contact with the second sectional pump housing member when the pump vanes are rotated through the pump chamber. After the pump vanes pass through the pump chamber, the first sectional pump housing member causes the pump vanes to be retracted back into their corresponding slots. The pump vanes remain in their slots in such retracted position as they are rotated past the first sectional pump housing member.

The pump vanes of the pump mechanism have at least a portion thereof formed of a magnetic material. The second sectional pump housing member has a layer of magnetic material on its inner surface facing the pump vanes. This layer of magnetic material magnetically attracts the pump vanes as the pump vanes are rotated through the pump chamber. This attraction force causes the pump vanes to extend out of their respective slots and for the outer ends of such pump vanes to be adjacent to the second sectional pump housing member as such extended pump vanes pass through the pump chamber. A spring is arranged within each of the slots in the pump chamber. This spring is positioned between the respective pump vane and the bottom of the slot for biasing the pump vane toward the sectional pump housing members.

The hydraulically driven bicycle of the present invention is provided with a hydraulic drive mechanism which drive mechanism is constructed in the same manner as the pump mechanism discussed above. This drive mechanism is arranged adjacent to either the front or rear wheel of the bicycle for generating a rotational force for driving such wheel. It also is possible to incorporate two hydraulic drive mechanisms with one such mechanism being located on each of the wheels of the bicycle so that both wheels of the bicycle are hydraulically driven. In addition, an operator controlled check valve can be arranged within the fluid circulating tube that is coupled to the output of the hydraulic drive mechanism for restricting the flow of fluid through the hydraulic drive mechanism so as to act as a brake by restricting the flow of fluid through the hydraulic drive mechanism and hence restricting the rotational movement of the drive cylinder and the corresponding wheel.

DESCRIPTION OF THE PREFERRED EMBODIMENTS

Figure 1:
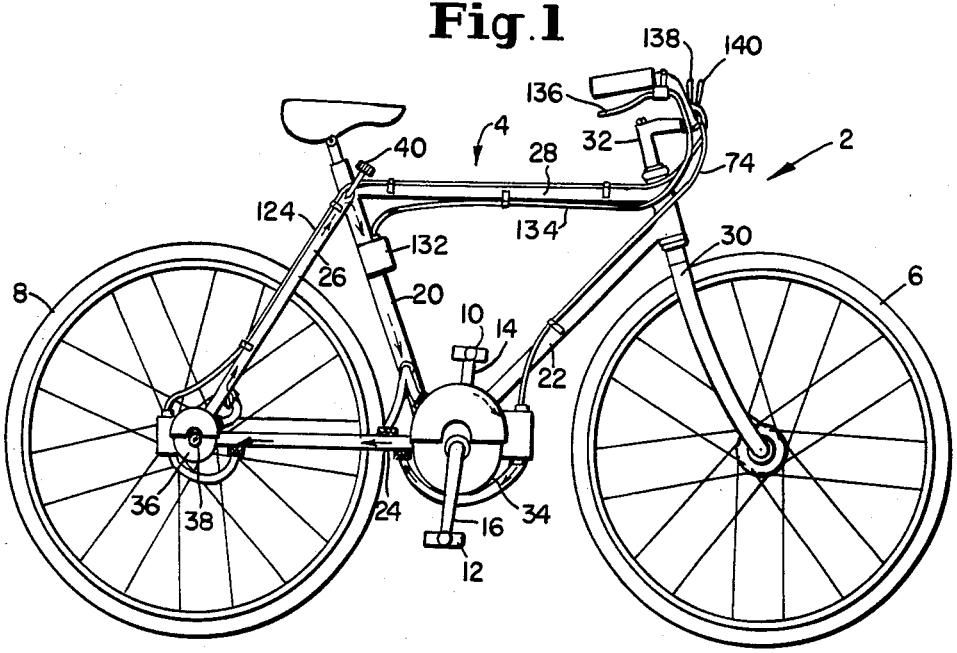
FIG. 1 is a front elevational view of a hydraulically driven bicycle in accordance with the present invention.

A bicycle 2 constructed in accordance with the present invention is shown in FIG. 1. This bicycle has a frame 4 on which there is mounted a front wheel 6 and a rear wheel 8. Pedals 10 and 12 are coupled to a pedal driven shaft 18 (FIG. 2) through pedal mount arms 14 and 16, respectively, for enabling the operator of the bicycle to operate the hydraulically driven drive system of the bicycle.

The hydraulic system of the present invention includes a hydraulic pump system 34 and a hydraulic drive system 36. The fluid tubes interconnecting the hydraulic pump system 34 and hydraulic drive system 36 are primarily arranged inside of or actually formed by the various tubular frame sections of the bicycle as further discussed below. These tubular frame sections of frame 4 include tubular sections 20, 22, 24, 26 and 28. In addition, a front yoke 30 that is connected to handlebar mount 32 holds front wheel 6 and in one embodiment of the hydraulically driven bicycle of the present invention is used for carrying some of the fluid tubes of the hydraulic system.

Hydraulic pump system 34 is mounted between frame members 20 and 22 and is positioned so that the pedal driven shaft 18 extends through this pump member for enabling the pump to be operated by manually driving pedals 10 and 12. Hydraulic drive system 36 in the particular embodiment shown in FIG. 1 is located for driving the rear wheel 8 of the bicycle. Hydraulic drive system 36 is rotated by fluid pumped by hydraulic pump system 34. Rotational movement of hydraulic drive 20 systemm 36 in turn rotates rear drive axle 38 which causes rotational movement of rear wheel 8. While the hydraulic system is a closed system, additional hydraulic fluid can be added if needed by removing filler cap 40, which is located under the bicycle seat. Hydraulic pump system 34 is shown in greater detail in FIGS. 2 and 3.

The hydraulic pump system has a housing that is formed by two sections, a first housing section 42 and a second housing section 44. A pump cylinder 46 is arranged inside of the two housing sections. The two housing sections 42 and 44 are movable with respect to each other and the first section 42 is arranged immediately adjacent to pump cylinder 46 while the other section 44 is spaced from pump cylinder 46. The distance between pump cylinder 46 and the second housing section 44 forms a pump chamber 47. By moving housing section 44 relative to housing section 42 and pump cylinder 46 the size of pump chamber 47 can be varied.

Pump cylinder 48 has a plurality of radially extending slots 56 in which a corresponding plurality of pump vanes, such as vanes 48, 50, 52 and 54 are arranged. These pump vanes are radially movable within their corresponding slots. The ends of the pump vanes can extend past the outer circumferential surface of pump cylinder 46 such as shown by extended pump vane 48.

Each of the pump vanes is formed either completely or at least a portion thereof of a magnetic material or is at least partially coated with a magnetic material. The inner surface of the second housing section 44 is covered with a layer of magnetic material 59. As pump cylinder 46 rotates, the pump vanes that pass through pump chamber 47 are drawn out of their respective slots to their extended positions by the magnetic attraction between magnetic layer 59 and the pump vanes. To assist in this withdrawal of the pump vanes from their slots, a small spring 58 is provided in the bottom of each of the slots.

Pump cylinder 46 is rotated by the rotational movement of pedal driven shaft 18 which is driven by the operation of the pedals by the bicycle operator. As pump cylinder 46 rotates, when the vanes are in the position shown by vane 50, the vanes begin to be attracted by magnetic layer 59 of the second housing section 44 so as to be drawn out of their slots. Fluid enters the pump chamber through fluid tube 61 which is coupled to pump inlet opening 60. Rotation of pump cylinder 46 with the pump vanes pumps the fluid entering pump chamber 47 through the pump chamber and causes such fluid to be expelled through pump outlet opening 62 which is connected to fluid tube 64. After the pump vanes pass pump outlet opening 62, they come back into contact with the inner surface of the first housing section 44 which causes the vanes, such as vane 52, to be pushed back into, i.e. retracted into, their respective slots so that the vanes are in the position shown by vane 54 as they rotate past housing section 42. Consequently, rotation of pump cylinder 46 causes the fluid to be pumped through pump chamber 44.

The fluid leaving pump chamber 47 enters fluid tube 64 which is in turn coupled to a fluid tube inside of frame member 24 by a coupling 66. The fluid entering the fluid tube inside of frame member 24, which fluid tube can be formed by the frame member itself or can be a separate tube inside of the frame member, is carried through the frame member 24 back to the hydraulic drive system 36. The operation of drive system 36 will be explained below.

Second housing section 44 is biased by a spring 68 to a closed position. Spring 68 extends between arms 70 and 72, which are attached to the housing sections at one side of such sections. The other sides of the housing sections are connected together, such as by a hinge connection. The effect of spring 68 on the positioning of second housing section 44 is adjustable by adjusting a tension cable 74. Tension cable 74 is attached to arm 70. Tension cable 74 enables the operator through a lever 140 to either pull arm 70 upwardly against the force of spring 68 so as to increase the distance between arms 70 and 72 or allows the force on arm 70 to be decreased so that spring 68 pulls arm 70 downwardly towards arm 72. Thus, the net force and effect of spring 68 is adjustable by the operator of the bicycle. By adjusting spring 68 through tension cable 74 the distance between arms 70 and 72 can be varied and hence the relative position of housing section 44 to housing section 42 and pump cylinder 46 can be varied thereby varying the size of chamber 47. In addition, if the bicycle operator pedals faster so as to more rapidly rotate pedal driven shaft 18 and pump cylinder 47, more fluid will be forced through pump chamber 47. This flow of additional fluid if great enough will increase the pressure within chamber 47 thereby counteracting the force of spring 68. This will cause second housing section 44 to move upwardly thereby increasing the size of chamber 47 so that more fluid is pumped through pump system 34 and hence more power obtained by rotational movement of pedal driven shaft 18.

Figure 2:
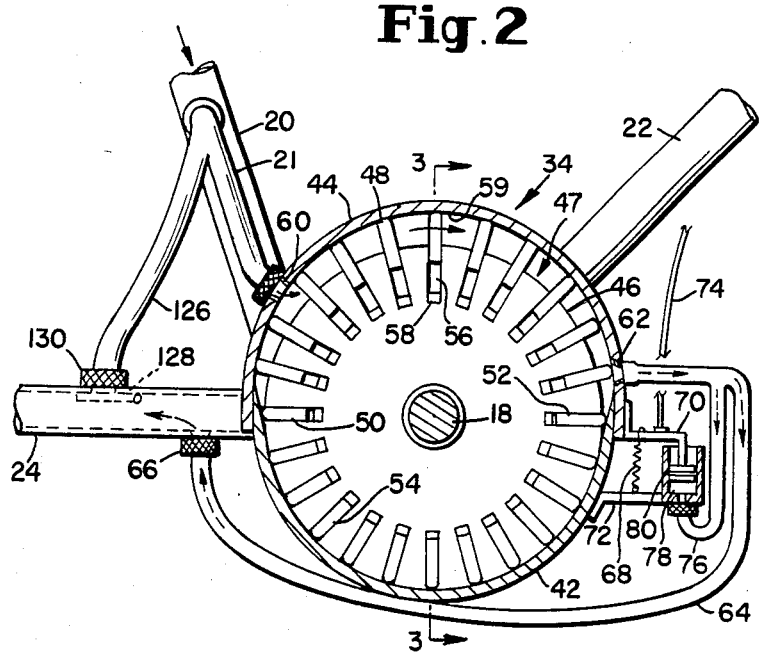
FIG. 2 is a front sectional view of the pump mechanism of the hydraulically driven bicycle shown in FIG. 1.
Figure 3:
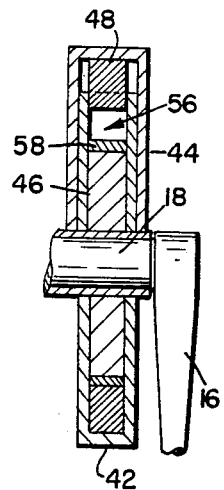
FIG. 3 is a partial sectional view along lines 3—3 of the pump mechanism shown in FIG. 2.

It also is possible to employ a supplemental piston counterbalancing system for assisting in the expansion of pump chamber 47 when fluid is more rapidly pumped through such chamber. In this alternative embodiment, which is shown in FIG. 2, a small portion of the fluid leaving the pump chamber through outlet opening 62 is supplied through a fluid tube 76 to a chamber 78. The fluid within chamber 78 applies a pressure against piston 80 which pushes arm 70 in an upward direction against the force of spring 68. Once spring 68, the pressure on piston 80 and the tension applied through tension cable 74 are in balance, an increase in the pressure of the fluid passing through pump chamber 47 and through outlet opening 62 will increase the pressure of the fluid entering chamber 78 thereby causing arm 70 to move upwardly and pump chamber 47 to increase in size. Similarly a drop in the pressure in chamber 48 will result in chamber 47 decreasing in size.

During normal operation as pedal driven shaft 18 is rotated, the fluid entering frame member 24 serves to maintain a flap valve 128 in an upward position. If the bicycle operator, however, stops pedaling, in order to enable the bicycle to coast, i.e. pedal driven shaft 18 is not to rotate, the fluid passing through frame member 20 can bypass pump system 34 through a fluid tube 126 which is connected to frame member 24 by a coupling 130. If fluid passes through fluid tube 126, this causes flap valve 128 to be pushed downwardly allowing the fluid to enter frame member 24 and to be carried back to the hydraulic drive system. When the pump system is operated, however, the pressure of the fluid entering frame member 24 from fluid tube 64 maintains flap valve 128 in its upward position blocking the flow of fluid through bypass fluid tube 126.

Figure 4:
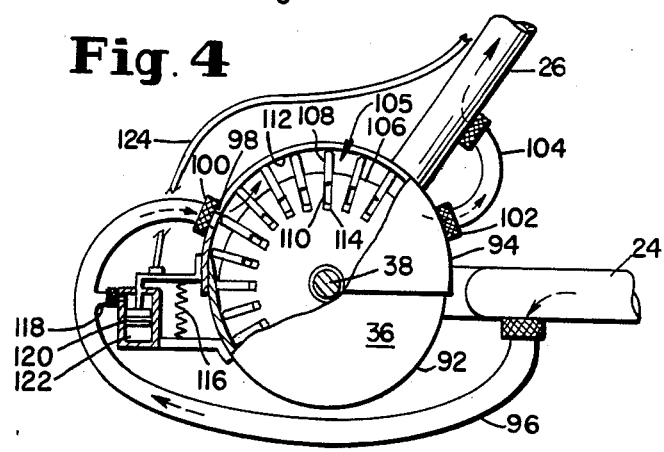
FIG. 4 is a front partial sectional view of the hydraulic drive mechanism of the hydraulically driven bicycle shown in FIG. 1.

The fluid pumped by pump system 34 passes through frame member 24 and enters a fluid tube 96. Fluid tube 96 is coupled through a coupling 100 to fluid inlet opening 98 of hydraulic drive system 36, shown in FIG. 4. Hydraulic drive system 36 includes a first housing section 92 and a second housing section 94. Arranged within the two drive housing sections is a drive cylinder 106. This drive cylinder 106 is mounted on rear axle 38. Rear axle member 38 can either be the actual rear axle or coupled through a coupling mechanism to the rear axle on which rear wheel 8 is mounted; in either situation, rotation of axle member 38 in turn rotates rear wheel 8.

Drive cylinder 106 has a plurality of slots such as slot 110 in which a plurality of drive vanes such as vane 108 are arranged. The area between drive cylinder 106 and second drive housing section 94 forms the drive chamber 105. As drive cylinder 106 is rotated, the drive vanes, which are at least partially formed or coated with a magnetic material, are attracted by a layer of magnetic material 112 which is on the inner surface of second drive housing section 94. To assist in causing the drive vanes to extend out of the slot past the circumferential surface of drive cylinder 106, a plurality of springs such as spring 114 are located at the bottom of each of the slots for the drive vanes.

The overall operation of the drive system 36 is similar to that of the pump system 34 except that the drive system is driven by the hydraulic fluid circulating through the hydraulic system instead of pumping the hydraulic fluid such as occurred with pump system 34.

The second drive housing section 94 is spring biased away from the first drive housing section 92 by a spring 116. The force of spring 116 is counterbalanced by a force applied through tension cable 124 which is connected for causing the housing sections to be moved towards each other. Cable 124 is connected to lever 138 on the handlebars of the bicycle. Thus, the operator can vary the effective length of spring 116 and hence the spring bias force and effect of such spring by varying the tension within tension cable 124. In addition, a portion of the fluid passing through fluid tube 96 enters chamber 122 and acts on piston 120 for applying a force in a direction for decreasing the size of chamber 105. This force created on piston 120 counterbalances the force created by spring 116. During operation, once the force of spring 116, the pressure on piston 120 and the force from tension cable 124 are in balance, if the pressure of the fluid passing through fluid tube 96 and entering the hydraulic drive system 36 increases, this results in an increase in the pressure on piston 120 and a movement of second drive housing section 94 so as to decrease the size of piston chamber 105. Thus, a more rapid pedaling of the pump system so as to increase the hydraulic fluid pressure in the fluid lines will result in a decrease in the size of drive chamber 105 and hence a higher effective gear ratio between the pump system and the drive system.

Fluid leaving drive chamber 105 is expelled through a fluid tube 104 into frame member 26. Fluid tube 104 is coupled to the outlet of drive system 36 by a coupling 102. The fluid is then circulated through frame member 26 back to frame member 20 where it reenters the pump system 34. Thus, a closed hydraulic power system is provided which in the embodiment in FIG. 1 includes frame members 20, 24 and 26 along with hydraulic pump system 34 and hydraulic drive system 36.

During operation of the bicycle, a braking force can be applied through operation of the hydraulic system. For applying such a braking force, a check valve mechanism 132 can be supplied. Check valve mechanism 132, which would be any standard type of check valve, is connected to a hand brake 136 through a tension cable 134. By closing the check valve inside check valve mechanism 132, the flow of fluid through frame member 20 is blocked. This in turn blocks the flow of fluid through the hydraulic system. When this occurs, the fluid within drive chamber 105 inhibits the movement of the drive vanes through such chamber and hence acts as a braking force on drive axle 38. This braking force in turn acts as a brake on rear wheel 8.

Figure 5:
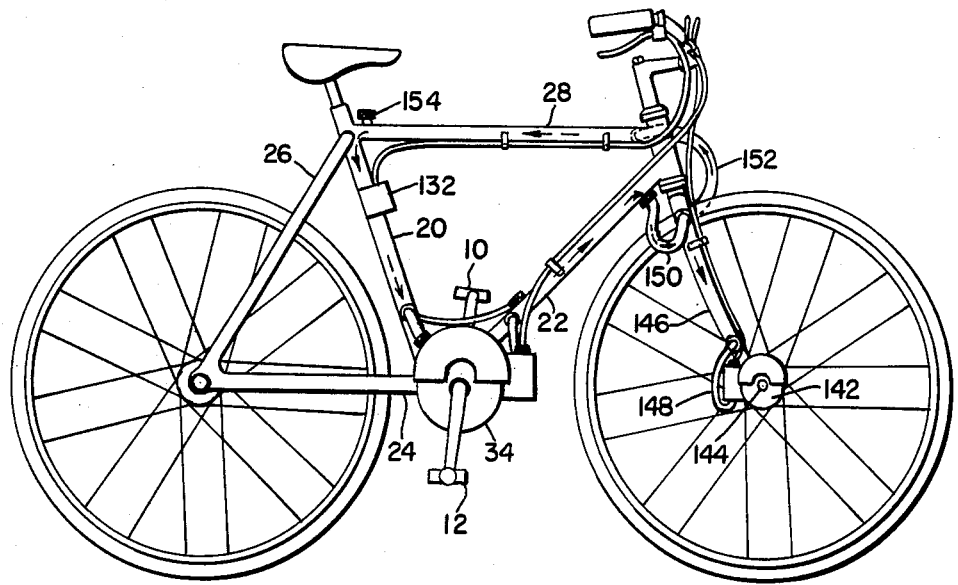
FIG. 5 is a front elevational view of another embodiment of a hydraulically driven bicycle in accordance with the present invention in which the hydraulic drive mechanism is arranged on the front wheel of the bicycle.

In an alternative embodiment of the hydraulically driven bicycle of the present invention, the drive mechanism can be arranged on the frame for driving the front wheel of the bicycle such as shown in FIG. 5. In a further embodiment of the hydraulically driven bicycle of the present invention, two drive mechanisms can be used with one mounted for driving the rear wheel of the bicycle and one mounted for driving the front wheel of the bicycle such as shown in FIG. 6.

In FIG. 5, a drive mechanism 142 is arranged on yoke 30 for driving a drive axle 144. In this embodiment, the fluid pumped by pump system 34 is circulated through frame member 22 to a fluid tube 150 which in turn supplies the fluid to yoke section 146 of yoke 30. The fluid then passes through yoke member 146 to a tube 148 where it is then supplied to an inlet opening of drive system 142. The fluid leaving drive system 142 is coupled through a fluid tube into the other side of yoke 30 and through another fluid tube 152 to frame member 28. The fluid is then circulated through frame member 28 back to frame 20 for recirculation through the pump. A filler cap 154 for adding additional hydraulic fluid is provided under the bicycle seat.

Figure 6:
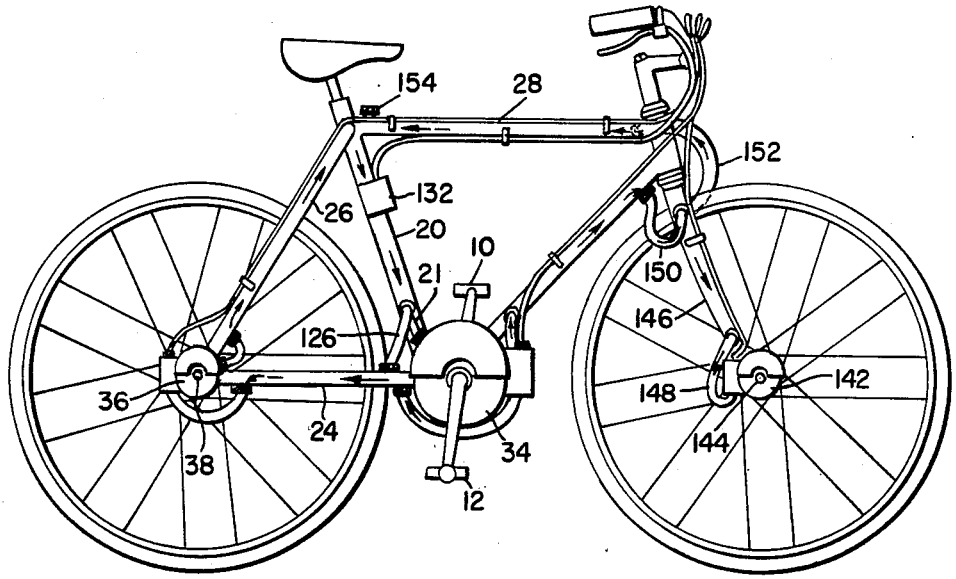
FIG. 6 is a front elevational view of a further embodiment of the hydraulically driven bicycle of the present invention in which hydraulic drive mechanisms are located on both the front and back wheels of the bicycle.

In FIG. 6, a rear drive system 36 is provided for driving the rear wheel of the bicycle and in addition a front drive system 142 is provided for driving the front wheel of the bicycle. All of the tube and other members are the same as discussed above in connection with each of these drive systems. In this embodiment, both wheels of the bicycle are driven by operation of pump system 34.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

I claim:

1. A hydraulically driven bicycle comprising:
a bicycle frame;
two axle members coupled to said bicycle frame;
front and rear wheels, each of said wheels being mounted on one of said axle members for rotation about the axis of the respective said axle member;
a pair of pedal members mounted on a pedal drive shaft coupled to said bicycle frame for rotation for applying manual power for operating said bicycle;
a hydraulic pump means operated by rotational movement of said pedal drive shaft, said hydraulic pump means including a pump housing having a pump chamber capable of being varied in size for varying the flow of fluid through said pump chamber, and said pedal drive shaft being coupled to said rotatable pumping means for driving said rotatable pumping means;
power enchancing means for increasing the size of said pump chamber responsive to an increase in the pressure of the fluid in said pump chamber;
a hydraulic drive means for driving one of said wheels, said hydraulic drive means including a drive chamber, a rotatable driving means arranged to be rotated as fluid is circulated through said drive chamber, and an output drive shaft coupled to and rotated by said hydraulic driving means as fluid is circulated through said drive chamber; and
a plurality of fluid circulating tubes for coupling the output of said pump means to the input of said hydraulic drive means and the output of said hydraulic drive means to the input of said pump means so that fluid is circulated through the hydraulic system.

2. A bicycle as in claim 1 wherein said pump housing includes two sectional pump housing members forming said pump chamber between them, said two sectional pump housing members being capable of relative movement with respect to each other so that said pump chamber is capable of being varied in size.

3. A hydraulically driven bicycle according to claim 2 wherein said rotatable pumping means includes a cylindrical pump member having a plurality of radially extending slots and a plurality of radially arranged pump vanes, each of said pump vanes is arranged and radially movable within a corresponding one of said slots in said cylindrical pump member and is capable of extending past the outer circumferential surface of said cylindrical pump member.

4. A hydraulically driven bicycle according to claim 3 wherein the distance that each of said pump vanes extends past the circumferential surface of said cylindrical pump member during rotation of said rotatable pumping means varies in dependence upon the size of said pump chamber.

5. A hydraulically driven bicycle according to claim 4 wherein said two sectional pump housing members surround said cylindrical pump member with a first said sectional pump housing members being arranged juxtaposed to said cylindrical pump member and the second of said sectional pump housing members being movable with respect to said first sectional pump housing member and said cylindrical pump member for varying the distance between said second sectional pump housing member and said cylindrical pump member with the space between them defining said pump chamber.

6. A hydraulically driven bicycle according to claim 5 wherein said pump means includes an inlet opening arranged at one side of said pump chamber for receiving fluid from one of said fluid circulating tubes and an outlet opening at the opposite side of said pump chamber for supplying fluid pumped through said pump means to another of said fluid circulating tubes.

7. A hydraulically driven bicycle according to claim 5 wherein said pump means includes means for causing said pump vanes to extend out of their respective said slots and to be in contact with said second sectional pump housing member when said pump vanes are rotated through said pump chamber and said first sectional pump housing member causes said pump vanes to be retracted into their slots when said pump vanes are rotated past said first sectional pump housing member.

8. A hydraulically driven bicycle according to claim 7 wherein said pump vanes have at least a portion thereof formed of a magnetic material and said second sectional pump housing member has a layer of magnetic material on its inner surface facing said pump vanes for attracting said pump vanes as said pump vanes are rotated through said pump chamber so as to cause said pump vanes to extend out of their respective said slots and for the outer ends of such extended pump vanes to be adjacent to said second sectional pump housing member as such extended pump vanes pass through said pump chamber.

9. A hydraulically driven bicycle according to claim 8 further comprising a spring arranged within each of said slots for said pump vanes and being positioned between the respective said pump vane and its respective said slot for biasing said pump vane outwardly towards said sectional pump housing members.

10. A hydraulically driven bicycle according to claim 7 wherein said power enhancing means includes a spring biasing means for biasing said second sectional pump housing members towards said first sectional pump housing member.

11. A hydraulically driven bicycle according to claim 10 wherein said spring biasing means can be adjusted so as to provide a variable spring bias force.

12. A hydraulically driven bicycle according to claim 11 further comprising operator controlled means for adjusting said spring biasing means for varying the spring bias force on said second sectional pump housing member.

13. A hydraulically driven bicycle according to claim 12 wherein said power enhancing means includes means for applying a counterforce to said variable spring bias force with such counterforce being dependent upon the pressure of the fluid leaving said pump chamber through said outlet opening.

14. A bicycle as in claim 13 wherein said means for applying a counterforce includes a piston chamber in fluid communication with said outlet opening, a piston defining a wall of said piston chamber and connected to said second sectional pump housing member such that an increase in the pressure in said piston chamber urges said piston to move said second sectional pump housing to increase the size of said pump chamber.

15. A bicycle as in claim 1 wherein said drive chamber is capable of being varied in size for varying the flow of fluid through said hydraulic drive means.

16. A bicycle in claim 15 wherein said hydraulic drive means includes a drive housing having two sectional drive housing members forming a drive chamber between them, said two sectional drive members being capable of relative movement with respect to each other so that said drive chamber is capable of being varied in size for varying the flow of fluid through said hydraulic drive means.

17. A hydraulically driven bicycle according to claim 16 wherein said rotatable driving means includes a cylindrical drive member having a plurality of radially extending slots and a plurality of radially arranged drive vanes, each of said drive vanes is arranged and radially movable within a corresponding one of said slots in said cylindrical drive member and is capable of extending past the outer circumferential surface of said cylindrical drive member.

18. A hydraulically driven bicycle according to claim 17 wherein the distance that each of said drive vanes extends past the circumferential surface of said cylindrical drive member during rotation of said rotatable driving means varies in dependence upon the size of said drive chamber.

19. A hydraulically driven bicycle according to claim 18 wherein said two sectional drive housing members surround said cylindrical drive member with a first of said sectional drive housing members being arranged juxtaposed to said cylindrical drive member and the second of said sectional drive housing members being movable with respect to said first sectional drive housing member and said cylindrical drive member for varying the distance between said second sectional drive housing member and said cylindrical drive member with the space between them defining said drive chamber.

20. A hydraulically driven bicycle according to claim 19 wherein said drive means includes an inlet opening arranged at one side of said drive chamber for receiving fluid from one of said fluid circulating tubes and an outlet opening at the opposite side of said drive chamber for supplying fluid circulated through said drive means to another of said fluid circulating tubes.

21. A hydraulically driven bicycle according to claim 19 wherein said drive means includes means for causing said drive vanes to extend out of their respective said slots and to be in contact with said second sectional drive housing member when said drive vanes are rotated through said drive chamber and said first sectional drive housing member causes said drive vanes to be retracted into their slots when said drive vanes are rotated past said first sectional drive housing member.

22. A hydraulically driven bicycle according to claim 21 wherein said drive vanes have at least a portion thereof formed of a magnetic material and said second sectional drive housing member has a layer of magnetic material on its inner surface facing said drive vanes for attracting said drive vanes as said drive vanes are rotated through said drive chamber so as to cause said drive vanes to extend out of their respective said slots and for the outer ends of such extended drive vanes to be adjacent to said second sectional drive housing member as such extended drive vanes pass through said drive chamber.

23. A hydraulically driven bicycle according to claim 22 further comprising a spring arranged within each of said slots for said drive vanes and being positioned between the respective said drive vane and its respective said slot for biasing said drive vane outwardly towards said sectional drive housing members.

24. A hydraulically driven bicycle according to claim 21 further comprising second spring biasing means for biasing said second sectional drive housing member away from said first sectional drive housing member.

25. A hydraulically driven bicycle according to claim 24 wherein said second spring biasing means can be adjusted so as to provide a variable spring bias force.

26. A hydraulically driven bicycle according to claim 25 further comprising operator controlled means for adjusting said spring biasing means for varying the spring bias force on said second sectional drive housing member.

27. A hydraulically driven bicycle according to claim 26, further comprising means for applying a counterforce to said variable spring bias force with such counterforce being dependent upon the pressure of the fluid leaving said pump chamber through said outlet opening.

28. A bicycle as in claim 27 wherein said means for applying a counterforce includes a piston chamber in fluid communicate with said inlet opening, a piston defining a wall of said piston chamber and connected to said second sectional drive housing member such that an increase in the pressure in said piston chamber urges said piston to move said second sectional drive housing to decrease the size of said pump chamber.

29. A hydraulically driven bicycle according to claim 19 wherein said hydraulic drive means is coupled to said rear wheel of said bicycle.

30. A hydraulically driven bicycle according to claim 19 wherein said hydraulic drive means is coupled to said front wheel of said bicycle.

31. A hydraulically driven bicycle according to claim 19 wherein there are two hydraulic drive means, one coupled to each of said wheels of said bicycle.

32. A hydraulically driven bicycle according to claim 19 further comprising an operator controlled check valve arranged in said fluid circulating tube coupled to the output of said hydraulic drive means for restricting the flow of fluid through said hydraulic drive means so as to act as a brake by restricting rotation of said driving means.

33. A bicycle as in claim 16 further comprising means for moving said drive members to decrease the size of said drive chamber responsive to an increase in the pressure of the fluid in said drive chamber.

34. A bicycle as in claim 1 further comprising:
coasting means for circulating fluid to by-pass the pump means to enhance coasting of the bicycle, said coasting means including a coasting fluid tube for providing fluid communication between the inlet tube to said pump means and the outlet tube to said pump means; and
coasting valve means for allowing fluid flow through said coasting tube when the fluid pressure at the outlet of said pump means is less than the fluid pressure at the inlet of said pump means and for inhibiting fluid flow through said coasting tube when the fluid pressure of the outlet of said pump means is greater than the fluid pressure at the inlet of said pump means.

35. A hydraulic pump operated by rotational movement of a drive shaft, comprising:
a pump housing having two sectional pump housing members forming a pump chamber between them, said two sectional pump housing members being capable of relative movement with respect to each other so that said pump chamber is capable of being varied in size for varying the flow of fluid through the pump, a rotatable pumping means for pumping fluid through said pump chamber, the drive shaft being coupled to said rotatable pumping means for driving said rotatable pumping means, and power enhancing means for increasing the size of said pump chamber responsive to an increase in the pressure of the fluid in said pump chamber.

36. A pump as in claim 35 wherein said rotatable pumping means includes a cylindrical pump member having a plurality of radially extending slots and a plurality of radially arranged pump vanes, each of said pump vanes is arranged and radially movable within a corresponding one of said slots in said cylindrical pump member and is capable of extending past the outer circumferential surface of said cylindrical pump member.

37. A pump as in claim 36 wherein the distance that each of said pump vanes extends past the circumferential surface of said cylindrical pump member during rotation of said rotatable pumping means varies in dependence upon the size of said pump chamber.

38. A pump as in claim 37 wherein said two sectional pump housing members surround said cylindrical pump member with a first of said sectional pump housing members being arranged juxtaposed to said cylindrical pump member and the second of said sectional pump housing members being movable with respect to said first sectional pump housing member and said cylindrical pump member for varying the distance between said second sectional pump housing member and said cylindrical pump member with the space between them defining said pump chamber.

39. A pump as in claim 38 including an inlet opening arranged at one side of said pump chamber for receiving fluid and an outlet opening at the opposite side of said pump chamber for exiting fluid pumped through the pump.

40. A pump as in claim 38 including means for causing said pump vanes to extend out of their respective said slots and to be in contact with said second sectional pump housing member when said pump vanes are rotated through said pump chamber and said first sectional pump housing members causes said pump vanes to be retracted into their slots when said pump vanes are rotated past said first sectional pump housing.

41. A pump as in claim 40 wherein said pump vanes have at least a portion thereof formed of a magnetic material and said second sectional pump housing member has a layer of magnetic material on its inner surface facing said pump vanes for attracting said pump vanes as said pump vanes are rotated through said pump chamber so as to cause said pump vanes to extend out of their respective said slots and for the outer ends of such extended pump vanes to be adjacent to said second sectional pump housing member as such extended pump vanes pass through said pump chamber.

42. A pump according to claim 41 further comprising a spring arranged within each of said slots for said pump vanes and being positions between the respective said pump vanes and its respective said slot for biasing said pump vane outwardly towards said sectional pump housing members.

43. A pump as in claim 40 wherein said power enhancing means includes spring biasing means for biasing said second sectional pump housing member towards said first sectional pump housing member.

44. A pump as in claim 43 wherein said spring biasing means can be adjusted so as to provide a variable spring bias force.

45. A pump as in claim 44 further comprising operator controlled means for adjusting said spring biasing means for varying the spring bias force on said second sectional pump housing member.

46. A pump as in claim 45 wherein said power enhancing means includes means for applying a counterforce to said variable spring bias force with such counterforce being dependent upon the pressure of the fluid leaving said pump chamber through said outlet opening.

* * * * *